United States Patent [19]
Melancon

[11] Patent Number: 4,533,575
[45] Date of Patent: Aug. 6, 1985

[54] LATENTLY-CURABLE ORGANOSILICONE RELEASE COATING COMPOSITION

[75] Inventor: Kurt C. Melancon, St. Paul, Minn.

[73] Assignee: Minnesota Mining and Manufacturing Company, St. Paul, Minn.

[21] Appl. No.: 683,212

[22] Filed: Dec. 18, 1984

Related U.S. Application Data

[62] Division of Ser. No. 535,040, Sep. 23, 1983, Pat. No. 4,504,645.

[51] Int. Cl.$^3$ .............................................. B05D 3/02
[52] U.S. Cl. ................................... 427/387; 428/447; 428/450; 428/451; 428/452; 528/15; 528/31; 528/32; 525/478
[58] Field of Search ................ 427/387; 428/447, 450, 428/451, 452; 528/15, 31, 32; 525/478

[56] References Cited

U.S. PATENT DOCUMENTS

| 3,188,299 | 6/1965 | Chalk | 260/46.5 |
|---|---|---|---|
| 3,188,300 | 6/1965 | Chalk | 260/46.5 |
| 3,192,181 | 6/1965 | Moore | 260/46.5 |
| 3,344,111 | 9/1967 | Chalk | 260/46.5 |
| 3,383,356 | 5/1965 | Nielsen | 260/46.5 |
| 3,445,420 | 5/1969 | Kookootudes et al. | 260/37 |
| 3,453,234 | 7/1969 | Kookootudes | 260/46.5 |
| 3,532,649 | 10/1970 | Smith et al. | 260/18 |
| 3,723,567 | 3/1973 | Mink et al. | 260/825 |
| 3,882,038 | 5/1975 | Clayton et al. | 252/164 |
| 3,933,880 | 1/1976 | Bergstrom et al. | 260/448.2 |
| 3,989,666 | 11/1976 | Niemi | 260/46.5 |
| 3,989,667 | 11/1976 | Lee et al. | 260/46.5 |
| 4,256,870 | 3/1981 | Eckberg | 528/15 |
| 4,336,364 | 6/1982 | Maxson | 528/15 |
| 4,337,332 | 6/1982 | Melancon et al. | 528/15 |
| 4,347,346 | 8/1982 | Eckberg | 528/15 |

FOREIGN PATENT DOCUMENTS 2073765 10/1981 United Kingdom .

Primary Examiner—Melvyn I. Marquis
Attorney, Agent, or Firm—Donald M. Sell; James A. Smith; Lorraine R. Sherman

[57] ABSTRACT

A latently-curable, organosilicone composition comprises a metal catalyzed organosilicone composition capable of undergoing hydrosilation and, as hydrosilation inhibitor, an organic monohydrogen derivative of an unsaturated aliphatic 1,4-dicarboxylic acid, i.e., maleic acid or acetylene dicarboxylic acid. The organic monohydrogen derivatives of use in this invention effectively inhibit catalyzed hydrosilation reactions at low or room temperature while allowing efficient hydrosilation reaction rates to occur at elevated temperatures. These monohydrogen derivatives perform their inhibitive function effectively at low concentration. The latently curable composition may be coated on a substrate to provide a release surface for an adjacent adhesive layer.

8 Claims, No Drawings

LATENTLY-CURABLE ORGANOSILICONE RELEASE COATING COMPOSITION

This is a division of application Ser. No. 535,040, filed Sept. 23, 1983, now U.S. Pat. No. 4,504,645.

DESCRIPTION

1. Technical Field

This invention relates to latently-curable organosilicone compositions capable of undergoing hydrosilation, to a process therefor, and to the cured products obtained therefrom. In another aspect it relates to the use of such materials in release liners for adhesive materials.

2. Background Art

For many years, articles have been made non-adherent to adhesive materials by the application to the articles of a coating of a silicone composition. Since this silicone composition generally was a highly viscous material, the use of solvents to dilute the material to a coating viscosity was required. The use of solvents, however, necessitated the use of energy to remove the solvents from the coating and also required the use of solvent recovery apparatus to prevent pollution of the atmosphere. These energy-intensive steps for providing non-adherent or release coatings to adhesive materials have added significantly to the cost of the resulting product. With the development of organosilicone compositions which undergo hydrosilation in the presence of a noble metal catalyst, such as platinum, palladium, rhodium, or iridium and compounds thereof, and which are fluid without requiring the use of solvents, the use of solvents and the associated energy and apparatus needed for solvent recovery can be avoided.

Hydrosilation involves the reaction of an organic silicon-containing compound having at least one silicon-bonded hydrogen with a compound containing aliphatic unsaturation and having at least one pair of carbon atoms linked to each other by ethylenic unsaturation. In the hydrosilation reaction, Si—H of one compound adds across the double bond of the other compound.

The noble metal catalyzed organosilicone compositions, however, generally have such a short shelf life, i.e., gelation takes place rapidly, that they are extremely difficult to use. In many instances it is desirable to initially retard or inhibit the hydrosilation reaction in the presence of all of the reactants and later initiate or "trigger" the reaction when desired. This requires the presence in the organosilicone compositions of an inhibitor material that inhibits hydrosilation at relatively low or ambient temperatures and allows the reaction to proceed normally at elevated temperatures, such compositions thus being latently curable compositions stabilized against premature gelation and generally known in the art.

Hydrosilation inhibitors fall into two general classes. One class is composed of materials that effectively inhibit hydrosilation over a wide range of temperatures and can be volatilized out of the organosilicone composition to allow hydrosilation to proceed. Examples of this class are pyridine (U.S. Pat. No. 3,188,299), acrylonitrile (U.S. Pat. No. 3,344,111), 2-ethenylisopropanol (U.S. Pat. No. 3,445,420), and perchloroethylene (U.S. Pat. No. 3,383,356). The other class of inhibitors are materials that are non-volatile; the inhibitory effect of these materials is overcome by heating, whereupon hydrosilation takes place. Examples of this latter class are the reaction product of a siloxane having silicone-bonded hydrogen atoms, a platinum catalyst, and an acetylenic alcohol (U.S. Pat. Nos. 3,989,666 and 4,336,364), organic phosphines and phosphites (U.S. Pat. No. 3,188,300), benzotriazole (U.S. Pat. No. 3,192,181), organic sulfoxides (U.S. Pat. No. 3,453,234), metallic salts (U.S. Pat. No. 3,532,649), aminofunctional siloxanes (U.S. Pat. No. 3,723,567), ethylenically-unsaturated isocyanurates (U.S. Pat. No. 3,882,038), olefinic siloxanes (U.S. Pat. Nos. 3,933,880, 3,989,666, and 3,989,667), dialkyl carboxylic esters (U.S. Pat. Nos. 4,256,870 and 4,347,346) and unsaturated amides (U.S. Pat. No. 4,337,332).

Prior art inhibitors often have a number of deficiencies. The volatile inhibitors have the disadvantage of requiring their removal from the composition before hydrosilation can commence. This leads to surface curing that retards complete reaction and leads to poor surface properties in the cured material such as wrinkling. The non-volatile inhibitors may have the disadvantage of requiring undesirably high temperatures and long curing times, e.g., greater than 150° C. for extended periods, i.e., more than 5 minutes, to effect curing, or of requiring high concentrations of inhibitors, which thus dilute the desired silicone content of the composition and thus effect the characteristics of coatings prepared therefrom.

SUMMARY OF THE INVENTION

The present invention in one aspect provides a latently-curable, organosilicone composition comprising a metal catalyzed organosilicone composition capable of undergoing hydrosilation and, as hydrosilation inhibitor, an organic monohydrogen derivative of an unsaturated aliphatic 1,4-dicarboxylic acid, i.e., maleic acid or acetylene dicarboxylic acid. The organic monohydrogen derivatives of use in this invention effectively inhibit catalyzed hydrosilation reactions at low or room temperature while allowing efficient hydrosilation reaction rates to occur at elevated temperatures. These monohydrogen derivatives perform their inhibitive function effectively at low concentration.

The invention also provides a process for providing a substrate with an adherent release coating for adhesive materials such as rubber, acrylate, or silicone adhesives, such process comprising the steps of: (1) providing a latently curable organosilicone composition as defined above, (2) coating said substrate with the composition, and (3) subjecting the coated substrate to conditions to effect curing (hydrosilation) of the composition.

As used in this application:

"catenary" means in the backbone (main chain) as opposed to being in a pendant or terminal group;

"aryl" means phenyl, naphthyl, and these group substituted by up to 4 lower alkyl($C_1$ to $C_4$) groups, and "halogen" means fluorine, chlorine, and bromine.

DETAILED DESCRIPTION OF THE INVENTION

A preferred class of the latently-curable, organosilicone compositions of the invention which are preferably fluid comprise the following components:

(1) an ethylenically-unsaturated polysiloxane having the empirical formula

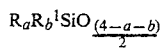  I (2) a polyhydrosiloxane having the empirical formula

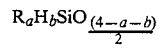  II wherein in formulas I and II each R is bonded to a silicon atom and is independently selected from the group consisting of monovalent aliphatic or aromatic hydrocarbon radicals or halogenated derivatives thereof, cyanoalkyl radicals, and combinations thereof such as 4-ethylphenyl, R having 1 to 13 carbon atoms and preferably 1 to 4 carbon atoms, $R^1$ is bonded to a silicon atom and is an ethylenically-unsaturated aliphatic hydrocarbon monovalent radical having 2 to 6 carbon atoms, subscript a is a number from 0 to 3 and preferably 0.5 to 2, subscript b is a number from 0.005 to 2.0, and preferably 0.05 to 2.0 and the sum of subscripts a and b is equal to a number from 0.8 to 3, (3) an amount of a platinum- or other metal-containing hydrosilation catalyst sufficient to effectively facilitate the hydrosilation reaction of components (1) and (2), and (4) an amount of an organic hydrosilation inhibitor sufficient to inhibit premature gelation of the composition at low ambient or room temperatures, e.g., 0° C. or lower and up to 40° C., but insufficient in amount to prevent hydrosilation at elevated temperatures, e.g., 50° to 200° C., said organic hydrosilation inhibitor having the structural formula

  III wherein
$R^2$ is ethynylene (—C≡C—) or cis-ethenylene

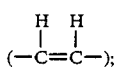

$R^3$ is a saturated or unsaturated organic group having 1 to 12 carbon atoms which can be unsubstituted or substituted by 1 to 23 halogen atoms, and has up to 25 hydrogen atoms, and 0 to 5 non-peroxidic catenary oxygen atoms, and preferably $R^3$ is selected from organic groups consisting of (1) acyclic straight-chain saturated and unsaturated aliphatic groups having 1 to 12 carbon atoms, (2) saturated and unsaturated alicyclic groups having 3 to 12 carbon atoms, (3) aryl groups having 6 to 12 carbon atoms, (4) alkaryl and aralkyl groups having 7 to 12 carbon atoms, (5) alkenylaryl and aralkenylene groups having 8 to 12 carbon atoms, and (6) alkoxyalkyl and poly(alkoxy)alkyl groups in which the alkyl groups have 2 to 4 carbon atoms and having a total of 4 to 12 carbons in the alkoxyalkyl and poly(alkoxy)alkyl groups; and
X is —O— or

in which $R^4$ is the same as defined for $R^3$, and $R^3$ and $R^4$ together can be alkylene which with the N can form a saturated 5- or 6-atom membered azacyclic ring, and preferably X is —O—.

A class of latent curable organosilicone compositions, of formulas I and II above, useful in the present invention are those disclosed in U.S. Pat. No. 3,436,366.

As to compositions having structural units represented by formula I above, the ethylenically-unsaturated polysiloxanes include normally fluid materials which preferably, but not necessarily, are free of silanic hydrogen. Among the groups which R represents in formula I above are included alkyl, such as methyl, ethyl, propyl, isopropyl, butyl, 2-ethylhexyl, octyl, and dodecyl, cycloalkyl, such as cyclopentyl, cyclohexyl, and cycloheptyl, aryl, such as phenyl, naphthyl, tolyl, and xylyl, aralkyl, such as benzyl, phenylethyl, and phenylpropyl, alkenylaryl, such as 4-vinylphenyl, aralkenyl, such as styryl, halogenated derivatives of the aforesaid groups such as chloromethyl, 2-fluoroethyl, 2,2,2-trifluoroethyl, 1,1-dihydroperfluoropropyl, 1,1-dihydroperfluorooctyl, 1,1-dihydroperfluorododecyl, 3,3,3-trifluoropropyl, chloropropyl, chlorophenyl, dibromophenyl, tetrachlorophenyl, and difluorophenyl, cyanoalkyl, such as betacyanoethyl, gamma-cyanopropyl, and beta-cyanopropyl. R is preferably methyl. Formula I is intended to include those substances wherein R is a combination of the aforesaid groups to provide a variety of structural units. $R^1$ in formula I contains ethylenic unsaturation. Among the groups represented by $R^1$ in formula I are alkenyl, such as vinyl, allyl, methallyl, butenyl, and pentenyl. $R^1$ is preferably vinyl or allyl, and $R^1$ most preferably is vinyl.

The unsaturated polysiloxanes encompassed within the scope of formula I above are well-known in the art, as particularly described in U.S. Pat. Nos. 3,882,083, 3,344,111, and 3,436,366, which descriptions are incorporated herein by reference. Similarly, their preparation and/or commercial availability are also well known.

Specific materials included within the scope of the ethylenically-unsaturated polysiloxanes of formula I above contain as few as one silicon atom, such as vinyltrimethylsilane, or more than one silicon atom, such as vinylpentamethyldisiloxane, 1,3-divinyltetramethyldisiloxane, 1,1,3-trivinyltrimethyldisiloxane, 1,1,3,3-tetravinyldimethyldisiloxane, as well as high molecular weight polymers containing up to 10,000 or more silicon atoms per molecule. Among cyclic materials, tetramethyltetrallylcyclotetrasiloxane and tetramethyltetravinylcyclotetrasiloxane are included. Preferred compounds of formula I are a vinyldimethyl endblocked polydimethylsiloxane fluid of 50 to 20,000 cps, most preferably 200 to 5,000 cps. Also preferred are vinyldimethyl endblocked polydimethylsiloxane fluids with up to 50 percent, preferably up to 20 percent, by weight of the dimethylsiloxy units replaced by diphenylsiloxy units. Also included within the scope of the ethylenically-unsaturated polysiloxanes of formula I are cyclic compounds containing silicon-bonded vinyl or allyl radicals, such as the cyclic trimer, tetramer, or pentamer of methylvinylsiloxane, $[(CH_2=CH)(CH_3)(SiO)]_z$, or methylallylsiloxane, [(CH$_2$=CH—CH$_2$)(CH$_3$)(SiO)]$_z$, wherein subscript z is an integer of 3 to 10.

The polyhydrosiloxane compounds or polymers having structural units represented by formula II above are normally fluid organopolysiloxanes which are preferably, but not necessarily, free of olefinic unsaturation in radical R, but which contain silanic hydrogen. These polyhydrosiloxane compounds represented by formula II above are also well-known in the art and are described in U.S. Pat. Nos. 3,344,111, and 3,436,366, which descriptions are incorporated herein by reference.

Among the radicals represented by R in formula II above are those mentioned above for R in formula I. Also intended to be included within the scope of formula II are those wherein R is a combination of the aforesaid radicals. The R group of formula II preferably is methyl.

Materials specifically encompassed within formula II above include 1,3-dimethyldisiloxane, 1,1,3,3-tetramethyldisiloxane, as well as high polymers containing up to 10,000 or more silicon atoms per molecule. Also included within the scope of formula II above are cyclic materials, such as cyclic polymers of methyl hydrogen siloxane having the formula (CH$_3$SiHO)$_z$, wherein subscript z is an integer from 3 to 10. Particularly included in tetramethylcyclotetrasiloxane. Within the scope of formula II are hydrogen siloxane units (HSiO$_{1.5}$), methyl hydrogen siloxane units (HSiCH$_3$O), dimethyl hydrogen siloxane units [HSi(CH$_3$)$_2$O$_{0.5}$], and dihydrogen siloxane units (H$_2$SiO).

The curable compositions preferably contain from 0.1 to 99.9 weight percent of the siloxane units of formula I with from 0.1 to 99.9 weight percent of the siloxane units of formula II, the weight percent being based on the weight of the total composition. Preferably, the curable compositions contain from 90 to 99 weight percent of ethylenically-unsaturated polysiloxane of formula I and 10 to 1 weight percent of polyhydrosiloxane of formula II.

The hydrosilation catalysts employed in the compositions of the present invention include all of the well-known platinum catalysts which are effective for catalyzing the hydrosilation reaction between silicon-bonded hydrogen groups and silicon-bonded ethylenic groups. These materials include, for example, a finely divided platinum catalyst, such as those described in U.S. Pat. No. 2,970,150, the chloroplatinic acid catalysts described in U.S. Pat. No. 2,823,218, the platinum hydrocarbon complexes taught in U.S. Pat. Nos. 3,159,601, and 3,159,662, as well as the platinum alcoholate catalysts described in U.S. Pat. No. 3,220,972. In addition, the platinum chloride-olefin complexes described in U.S. Pat. No. 3,416,946 are useful herein. All of the teachings of hydrosilation catalysts in the aforesaid U.S. patents are incorporated herein by reference.

Preferably, a platinum catalyst is employed, in this invention. It is generally present in an amount related to the amount of the ethylenically-unsaturated radicals in the polysiloxane component and in an amount sufficient to cause the co-reaction of the ethylenically-unsaturated polysiloxane, component (1), and the polyhydrosiloxane, component (2). The platinum catalyst is present in sufficient amount to catalyze the hydrosilation reaction. Satisfactory results may be obtained when the platinum catalyst is present in amounts sufficient to provide as little as one part of platinum per million parts of the unsaturated polysiloxane. On the other hand, amounts of the platinum catalyst sufficient to provide as high as 1 to 10 parts of platinum per 1,000 parts of the unsaturated polysiloxane may also be used. In general, however, it is preferred to employ the platinum catalyst in an amount sufficient to provide one to two hundred parts of platinum per one million parts of the unsaturated polysiloxane component. Also, metals such as rhodium, iridium, and palladium, and their compounds are known to catalyze these hydrosilation reactions and their use is intended to be within the scope of the present invention. Platinum and its compounds are the preferred catalyst.

The premature gelation-inhibiting organic monohydrogen derivatives of formula III are monoesters or monoamides of unsaturated aliphatic 1,4-dicarboxylic acids that are prepared by well known techniques. Preferably, they are prepared by reaction of one mole of maleic anhydride or acetylenedicarboxylic acid with one mole of an alcohol, R$^3$—OH, or an amine,

in which R$^3$ and R$^4$ are as defined for formula III. Examples of monohydrogen esters are methyl hydrogen, maleate, ethyl hydrogen maleate, 2-fluoroethyl hydrogen maleate, 2,2,2-trifluoroethyl hydrogen maleate, 1,1-dihydroperfluoropropyl hydrogen maleate, 1,1-dihydroperfluorooctyl hydrogen maleate, 1,1-dihydroperfluorododecyl hydrogen maleate, butyl hydrogen maleate, hexyl hydrogen maleate, dodecyl hydrogen maleate, isopropyl hydrogen maleate, 2-ethylhexyl hydrogen maleate, isooctyl hydrogen maleate, cyclobutyl hydrogen maleate, cyclopentyl hydrogen maleate, cyclohexyl hydrogen maleate, 3,3,5-trimethylcyclohexyl hydrogen maleate, 1-isopropyl-4-methylcyclohexyl hydrogen maleate, ethenyl hydrogen maleate, isopropenyl hydrogen maleate, allyl hydrogen maleate, 3-hexenyl hydrogen maleate, 3-cyclohexenyl hydrogen maleate, 3,5,5-trimethyl-2-cyclohexenyl hydrogen maleate, phenyl hydrogen maleate, benzyl hydrogen maleate, naphthyl hydrogen maleate, 4-t-butylphenyl hydrogen maleate, 4-vinylphenyl hydrogen maleate, methyl hydrogen acetylenedioate, ethyl hydrogen acetylenedioate, 2,2,2-trifluoroethyl hydrogen acetylenedioate, isopropyl hydrogen acetylenedioate, 2-ethylhexyl hydrogen acetylenedioate, cyclopentyl hydrogen acetylenedioate, 3,3,5-trimethylcyclohexyl hydrogen acetylenedioate, ethenyl hydrogen acetylenedioate, allyl hydrogen acetylenedioate, phenyl hydrogen acetylenedioate, naphthyl hydrogen acetylenedioate, and 4-t-butylphenyl hydrogen acetylenedioate.

Examples of monoamides of unsaturated aliphatic 1,4-dicarboxylic acids that are useful as gelation inhibitors in the composition of the invention are
N-methylmaleamic acid, N,N-dimethylmaleamic acid, N-ethylmaleamic acid, N-2,2,2-trifluoroethylmaleamic acid,
N,N-diethylmaleamic acid, N-propylmaleamic acid,
N-butylmaleamic acid, N,N-bis(2-ethylhexyl)maleamic acid,
N-cyclopentylmaleamic acid, N-pentamethylenemaleamic acid,
N-allylmaleamic acid, N-phenylmaleamic acid,
N-methylcarbamoylpropiolic acid,
N,N-dimethylcarbamoylpropiolic acid, N-ethylcarbamoylpropiolic acid, N-(2-ethylhexyl)carbamoylpropiolic acid,
N-cyclohexylcarbamoylpropiolic acid,
N-allylcarbamoylpropiolic acid,
N,N-diallylcarbamoylpropiolic acid,
N,N-diphenylcarbamoylpropiolic acid, and
N-tetramethylenecarbamoylpropiolic acid.

The proportions of the reacting components employed in the compositions of the present invention, as mentioned above, can vary within wide limits. These proportions of the components are affected by the stoichiometry of the addition curable reactants, silicone components (1) and (2), since many of the hydrosilation products prepared from the compositions of the invention exhibit satisfactory properties for intended purposes even when the final product contains unreacted silicon-hydrogen linkages. For economic and commercial purposes it is generally preferred that the ethylenically-unsaturated polysiloxane and the polyhydrosiloxane be present in such proportions that the latent curable organosilicone composition contains from about 0.005 to 20, preferably 0.1 to 3.0, silicon-hydrogen linkages per silicon-bonded ethylenically unsaturated radical. However, it is often desirable to have an essentially equal number of silicon-hydrogen linkages and ethylene groups in the composition so as to produce a final product which is substantially free of either silicon-hydrogen linkages or silicon-bonded ethylenically-unsaturated radicals.

The organic monohydrogen derivative of an unsaturated aliphatic 1,4-dicarboxylic acid used in the present invention is effective in inhibiting low and room temperature (e.g., 0° C. or lower and up to 40° C.) cure reactions while allowing rapid cures (e.g., less than 1 sec. to about 5 min. and preferably less than 30 sec.) at elevated temperatures, e.g., 50° C. to 200° C. Such inhibitory properties ensure a useful pot life (which can be unusually long, e.g., more than 3600 hours) of the above-mentioned compositions, yet allow rapid curing when desired. Preferably the hydrosilation inhibitors of the present invention are used at concentrations of 0.5 to 300 times the weight of metal hydrosilation catalyst in the composition. The metal hydrosilation catalysts are present in sufficient amount of catalyze the hydrosilation reaction.

The organosilicone composition can also contain other ingredients such as dyes, pigments, and reinforcing fillers, e.g., carbon black, fumed silica, titanium dioxide, clay, etc. Also, when it is desired to modify the release character of the cured organosilicone compositions of the invention, that is, increase the adhesive release level from the surface of the cured organosilicone composition from a low value of less than about 10 g/2.5 cm width to a higher value of 20 to 400 g/2.5 cm width or more, 2 to 100 parts or more of release modifiers can be added to 100 parts of the composition as is known in the silicone release art. Examples of such release modifiers include: graft polymers having a polyorganosiloxane segment and an organic polymer segment as are described in U.S. Pat. No. 4,366,286; vinyl terminated diorganopolysiloxanes in which 2 to 50, and preferably 3 to 39, mole percent of the diorgano units are nonterminal diphenylsiloxane units; the three-dimensional toluene-soluble silicate resins known in the silicate art as MQ resins which are the co-hydrolysis product of a mixture of one or more hydrolyzable silanes of the formula $(R^5)_cSiY_{4-c}$ in which $R^5$ is a monovalent hydrocarbon group attached to silicon, Y is a hydrolyzable group (i.e. a group that with water undergoes a metathetical reaction and is replaced by hydroxyl), and c is zero or an integer of 1, 2, or 3. Such compounds are known in the art and are described in part in U.S. Pat. No. 3,936,582 and more fully in U.S. Pat. Nos. 2,676,182 and 2,857,356, which patents are incorporated herein by reference. Also incorporated herein by reference are the reaction products of MQ resins with organohydrogenpolysiloxanes described in U.S. Pat. No. 4,310,678 and No. 4,322,518. A preferred MQ modifier is that obtained by the co-hydrolysis of 0.5 mole of $(CH_3)_3SiCl$ and 0.5 to 1.0 mole of $Si(OC_2H_5)_4$ followed by reaction with $[(CH_3)_3Si]_2NH$ or $[(CH_2=CH)(CH_3)_2Si]_2NH$ to reduce the hydroxyl level of the modifier to less than 1.0 percent by weight. Release modifiers find use in differential release liners for adhesive material. A typical liner comprises a flexible polymeric film substrate bearing on each surface thereof the cured composition of the present invention, the composition on at least one of said surfaces comprising a release modifier so as to provide an adhesive release differential of at least 10 percent. A preferred release liner for adhesive materials comprises a substrate bearing on each surface of above-described cured composition, wherein in the composition on one of said surfaces R is methyl, and in the composition on the second surface 2 to 50 mole percent, preferably 3 to 39 mole percent, and most preferably 5 to 25 mole percent of R is phenyl and the remaining R is methyl.

The latently-curable organosilicone compositions of the present invention can be prepared by mixing, in any suitable fashion, all of components (1) to (4) thereof described hereinabove, plus any additional useful adjuvants often used in organosilicone compositions, e.g., pigments, plasticizers, fillers, etc. As a result of the latent curing ability of the present compositions, these premixed compositions can be stored as such as kept at low ambient or room temperature for extended periods of time until ready to be used. Thus, they provide extended work life without concern for premature gelling.

While the compositions of the present invention can be prepared by premixing all the various components in any desired fashion, it may be found more convenient to prepare these compositions in two separate portions or packages, e.g., in the form of a kit, which are later combined at the time the compositions are to be applied and then cured to a solid rubbery state. Therefore, in the case of a two-package formulation, it is convenient and preferable to include in the kit (1) a first package having an ethylenically-unsaturated polysiloxane and an amount of a metal-containing hydrosilation catalyst sufficient to facilitate the hydrosilation reaction, and (2) a second package having a polyhydrosiloxane and an amount of an organic hydrosilation inhibitor sufficient to inhibit premature gelation of the organosilicone composition at low, ambient or room temperature but insufficient in amount to prevent hydrosilation at an elevated temperature, said organic hydrosilation inhibitor having the structural formula

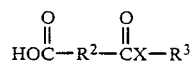

III wherein
$R^2$, $R^3$, and X are as desribed above;

When the two-package system is employed, the portions are merely mixed in suitable fashion at the point of use and the mixture is cured with the application of heat.

When an ethynylene compound of formula III is used in the composition as the hydrosilation inhibitor, it may be preferable to use a unitary package system. For example, when ethyl hydrogen acetylenedioate was used (see EXAMPLE 1, Sample 2, below) the composition remained fluid for over 3600 hours and still gelled in 5 sec. at 150° C. The composition can be stored, even in an open container, with no effect upon gel time or viscosity.

Other materials or adjuvants commonly used with organosilicone compositions such as release modifiers, fillers such as quartz, silica, titanium dioxide, carbon black, glass fibers, coloring agents, and pigments may be placed in either or both of the packages if desired. The second package generally contains as its ingredients the polyhydrosiloxane component and the hydrosilation inhibitor. However, as a matter of convenience, the second package may also contain all or part of the ethylenically-unsaturated polysiloxane, and a portion of, for example, the filler material if desired. Conveniently, the packages are of approximately equal weights, but any ratio of weights is acceptable so long as the desired reactant proportions are maintained.

The organosilicone compositions of the present invention are preferably low to medium viscosity, i.e., less than 5000 centipose fluids but they can be stiff plastic, dough-like substances. They can be used for any application requiring a release coating where heat activated curing is possible. They are particularly useful as release coatings for paper and other sheet material, which constructions are taught in U.S. Pat. Nos. 4,256,870 and 4,347,346. Other suitable substrates include glassine, vegetable parchment, kraft paper, metal foils, plastic films such as cellophane, polyethylene, polypropylene, vinyl resins, acrylic resins, polyamide resins and polyester resins. The latently curable composition of the present invention may be coated on a substrate by any means known in the art to provide a release surface for an adjacent adhesive layer.

Objects and advantages of this invention are further illustrated by the following examples, but the particular materials and amounts thereof recited in these examples, as well as other conditions and details, should not be construed to unduly limit this invention.

EXAMPLE 1

The effectiveness of 13 of the hydrosilation inhibitors of the present invention was demonstrated in a series of runs by incorporating one of them in each run at a level of 0.25 weight percent into a composition prepared by mixing an ethylenically-unsaturated polysiloxane which can be represented by the formula

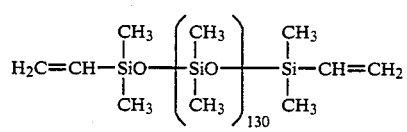

to which 100 ppm of platinum as platinum dichloride/divinyl tetramethyldisiloxane complex had been added with 2.5 weight percent of polyhydrosiloxane (DC 1107TM, Dow Corning Corp.) which can be represented by the formula

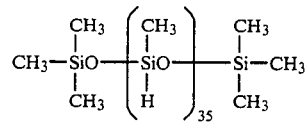

Table I lists various hydrosilation inhibitors incorporated into the composition (designated as samples 1–13) and gives the gel time (i.e., the time it takes for ten grams of the composition to crosslink to a rubbery state as determined by ASTM Method D-2471-71, reapproved 1979) at ambient temperature (RT) obtained using a Sunshine gel time meter (Sunshine Scientific Instruments, Inc., Philadelphia, PA). The gel time at 90° C., as well as the temperature required to effect gelling in less than five seconds, was determined using a "Kofler Heizbank" hot bar (Reichert Co., Austria).

TABLE I

| Sample no. | Inhibitor (0.25% by weight) | °C. for gel in 5 sec. | Gel time at 90° C. (sec.) | Gel time at RT (hrs.) |
|---|---|---|---|---|
| 1 | methyl hydrogen maleate | 105 | 11 | 105 |
| 2 | ethyl hydrogen acetylenedioate | 150 | >60 | >3600 |
| 3 | allyl hydrogen maleate | 100 | 12 | 225 |
| 4 | butyl hydrogen maleate | 105 | 11 | 56 |
| 5 | 2-methoxyethyl hydrogen maleate | 112 | >60 | 115 |
| 6 | cyclohexyl hydrogen maleate | 100 | 12 | 188 |
| 7 | benzyl hydrogen maleate | 100 | 15 | 158 |
| 8 | octyl hydrogen maleate | 110 | 25 | 45 |
| 9 | isooctyl hydrogen maleate | 110 | 25 | 43 |
| 10 | 2-ethylhexyl hydrogen maleate | 100 | 15 | 108 |
| 11 | dodecyl hydrogen maleate | 90 | 5 | 27 |
| 12 | N,N—bis(2-ethylhexyl)-maleamic acid | 120 | >60 | 11 |
| 13 | 2,2,2-trifluoroethyl hydrogen meleate | 110 | 15 | >144 |

The data of TABLE I show that at a concentration of 0.25 weight percent, the monoalkyl, the monocycloalkyl, and the monoaralkyl esters inhibit hydrosilation for at least 48 hours but still allow gel formation to take place in 5 sec. at 112° C. or less. It can also be seen that the monoalkyl ester of acetylenedicarboxylic acid inhibits hydrosilation for more than 3600 hours but allows gel formation in 5 sec. at 150° C.

EXAMPLE 2

Comparison of the monoesters with the diesters of various unsaturated 1,4-dicarboxylic acids as inhibitors of premature gelation was made using a hydrosilation composition as described in samples 14–18. The procedure and components were the same as in EXAMPLE 1 except that the inhibitors were as specified in TABLE II below. All A samples contain monoesters and B samples contain diesters. The results obtained are given in TABLE II.

TABLE II

| Sample No. | Inhibitor (0.25% by weight) | °C. for gel in 5 sec. | Gel time at 90° C. sec. | at RT (hrs) |
| --- | --- | --- | --- | --- |
| 14 A | methyl hydrogen meleate | 105 | 11 | 105 |
| B | dimethyl maleate | 90 | 5 | 24 |
| 15 A | methoxyethyl hydrogen maleate | 115 | 60 | 112 |
| B | bis(methoxyethyl) maleate | (a) | (a) | 0.15 |
| 16 A | allyl hydrogen maleate | 100 | 12 | 225 |
| B | diallyl maleate | 100 | 10 | 102 |
| 17 A | octyl hydrogen maleate | 110 | 30 | 45 |
| B | dioctyl maleate | (a) | (a) | 0.25 |
| 18 A | ethyl hydrogen acetylenedicarboxylate | 150 | >60 | >3600 |
| B | diethyl acetylenedicarboxylate | 115 | 30 | 8 |

(a) Not measured because gel time at room temperature was only 15 minutes.

The data of TABLE II show that the monohydrogen derivatives of maleic acid and acetylenedicarboxylic acid, at a concentration of 0.25 weight percent, retard gelation for a period of time much longer than the time demonstrated by the corresponding diesters that are suggested in the prior art (see U.S. Pat. Nos. 4,246,870 and 4,347,346 which disclose dialkyl carboxylic acid esters) for this purpose.

EXAMPLE 3

A xylene soluble silicone resin copolymer solution (100 g) consisting of 40 percent xylene and 60 percent non-volatile silicone resin composed of M units, i.e., $(CH_3)_3SiO_{1/2}$, and Q units, i.e., $SiO_{4/2}$, wherein the molar ratio of M units to Q units was 0.7 and the OH content was 3.0 percent, was reacted with 3.3 g hexamethyldisilazane at 100° C. for 8 hours to reduce the hydroxyl content to less than 1 percent. To this solution without cooling was added 180 g of the ethylenically-unsaturated polysiloxane fluid utilized in EXAMPLE 1. The resultant blend was further heated to 150° C. under a vacuum of 1 mm Hg and maintained at these conditions until xylene no longer distilled away from the polymer-copolymer blend. After cooling to room temperature, a platinum/vinyl siloxane catalyst (see U.S. Pat. No. 3,715,334, EXAMPLE 5) was added to the above polymer-copolymer blend to provide 100 parts of platinum metal per 1,000,000 parts of silicone composition. After mixing for 10 minutes, 0.6 g of 2-ethylhexyl hydrogen maleate gellation inhibitor was added and the catalyzed, inhibited silicone solution mixed for an additional 10 min. Next, there was added 6 g of the polyhydrosiloxane crosslinker utilized in EXAMPLE 1. The resultant mixture was stirred 15 min. more to yield a solventless silicone coating composition.

The silicone coating composition was then applied to 60-lb brown super-calendered kraft paper (weighing about 105 g/m²) with a 3-roll differential speed offset gravure coater, equipped with a 200 line/inch (about 79 line/cm) gravure cylinder, a rubber transfer roll, and a steel back-up roll; the transfer and back-up rolls turned at a surface speed of 45 ft/min (13.7 m/min), and the gravure cylinder at a surface speed of 13.5 ft/min (4.1 m/min). The resultant coating weight was 1 g/m². (Differential speed coating of silicones is described in U.S. Pat. No. 4,216,252).

The silicone-coated paper was then cured for 60 seconds at 150° C. in a circulating-air oven to form a release liner.

A 25 percent solids 70:30 heptane:isopropanol solution of pressure-sensitive adhesive comprising a 95.5:4.5 isooctyl acrylate:acrylic acid copolymer, as described in U.S. Pat. No. Re. 24,906, was applied at a coating weight of 32 g/m² (dry weight) to the silicone-coated surface and dried for 5 minutes at 70° C. in a circulating-air oven, after which 38-micrometer biaxially-oriented polyethylene terephthalate (PET) film was laminated to the surface. The resultant laminate was cut into 2.5×25 cm strips; the strips were attached to a horizontal plate with the PET film side up, and the release value measured while pulling the PET film with adhesive adhering thereto away from the silicone-coated surface at an angle of 180° and a stripping speed of 230 cm/min. This release value was 33–38 g/2.5 cm width.

A control sample was prepared that contained no M/Q release modifier. This sample was prepared as in EXAMPLE 1, Sample 10, except the platinum/vinyl siloxane catalyst used above was employed rather than the previous platinum dichloride/divinyltetramethyldisiloxane complex of EXAMPLE 1, Sample 10. Coating, curing, and testing are carried out in exactly the same manner as described above. A release value of 8.0 g/2.5 cm width was obtained.

It is apparent from this comparison that the addition of a silicone resin modifier to a solventless silicone coating composition increases the release level obtained from the cured composition. Further, it should be noted that the coating composition of EXAMPLE 3 and its control could be coated and cured on opposite sides of a substrate to prepare a differential release liner. Differential release liners are utilized in the manufacture of transfer tapes.

EXAMPLE 4

To 100 g dimethylpolysiloxane-diphenylpolysiloxane random copolymer (viscosity 500 cps) containing 15 mole percent diphenylsiloxane units and endblocked with dimethylvinylsiloxy groups (identified as PS 782, Petrarch Systems, Incorporated) was added the platinum/vinyl siloxane catalyst employed in EXAMPLE 3 and its control to provide 100 ppm platinum metal. After mixing 10 minutes, 0.25 g 2-ethylhexyl hydrogen maleate gelation inhibitor was added and the catalyzed inhibited siloxane copolymer mixed for an additional 10 minutes. Next, there was added 2.5 g of the polyhydrosiloxane crosslinker utilized in EXAMPLE 1. This solution was stirred 15 min. more to yield a controlled release solventless silicone coating composition. Coating, curing and testing was carried out in exactly the same manner as described in EXAMPLE 3. A release value of 308 g/2.5 cm width was obtained. Release values obtained in EXAMPLES 3 and 4 demonstrate the wide range of release values over which the inhibitors of this invention function satisfactorily.

Various modifications and alterations of this invention will become apparent to those skilled in the art without departing from the scope and spirit of this invention, and it should be understood that this invention is not to be unduly limited to the illustrative embodiments set forth herein.

I claim:
1. A process comprising the steps:
    (a) providing a latently-curable organosilicone composition by mixing at ambient temperatures
        (1) an ethylenically-unsaturated polysiloxane,
        (2) a polyhydrosiloxane,

(3) an effective amount of a metal-containing hydrosilation catalyst to facilitate the addition cure reaction of components (1) and (2), and (4) an amount of a hydrosilation inhibitor 1,4-dicarboxylic acid compound sufficient to inhibit premature gelation of the mixture of components (1), (2), and (3) at low, ambient or room temperature but insufficient in amount to prevent hydrosilation of the mixture at an elevated temperature, said hydrosilation inhibitor having the structural formula $$HOC-R^2-CX-R^3 \quad \text{III}$$
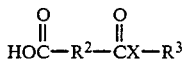

wherein $R^2$ is ethynylene or cis-ethenylene;

$R^3$ is a saturated or unsaturated organic group having 1 to 12 carbon atoms which is unsubstituted or substituted by 1 to 23 halogen atoms, and has up to 25 hydrogen atoms; and X is —O— or

in which $R^4$ is the same as defined for $R^3$, and $R^3$ and $R^4$ together with the N can form a saturated azacyclic ring, (b) coating a substrate with said admixture, and (c) elevating the temperature of the resulting coated admixture when cure of said admixture is to be effected.

2. The process according to claim 1 wherein said latently-curable organosilicone composition further comprises 2 to 100 parts of a release modifier per 100 parts of said composition.

3. The process according to claim 2 wherein said release modifier is an MQ resin.

4. A release liner for adhesive materials comprising a substrate coated on at least one surface thereof with a cured adhesive composition comprising the following components:

(a) an ethylenically-unsaturated polysiloxane, (b) a polyhydrosiloxane, (c) an amount of a platinum or other metal-containing hydrosilation catalyst sufficient to facilitate the reaction of components (a) and (b), and (d) an amount of an organic hydrosilation inhibitor sufficient to inhibit premature gelation of the mixture of components (a), (b), and (c) at low, ambient or room temperature but insufficient in amount to prevent hydrosilation of the mixture at an elevated temperature, said organic hydrosilation inhibitor having the structural formula $$HOC-R^2-CX-R^3 \quad \text{III}$$
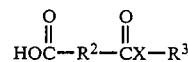

wherein $R^2$ is ethynylene or cis-etheynlene;

$R^3$ is a saturated or unsaturated organic group having 1 to 12 carbon atoms which is unsubstituted or substituted by 1 to 23 halogen atoms, and has up to 25 hydrogen atoms, and 0 to 5 non-peroxidic catenary oxygen atoms; and X is —O— or

in which $R^4$ is the same as defined for $R^3$, and $R^3$ and $R^4$ together can form an alkylene group which with the N can form a 5- or 6-atom membered saturated azacyclic ring.

5. The release liner according to claim 4 wherein in said adhesive composition said hydrosilation inhibitor is 2-ethylhexyl hydrogen maleate.

6. The release liner for adhesive material according to claim 4 bearing on each surface thereof said cured adhesive composition, said composition on at least one of said surfaces further comprising a release modifier so as to provide an adhesive release differential of at least 10 percent.

7. The release liner of claim 6 wherein said release modifier is an MQ resin.

8. The release liner for adhesive material according to claim 6 wherein in the composition on one surface R is methyl, and in the composition on the second surface 2 to 50 mole percent of R is phenyl and the remaining R is methyl.

* * * * *

UNITED STATES PATENT AND TRADEMARK OFFICE
CERTIFICATE OF CORRECTION

PATENT NO. : 4,533,575

DATED : August 6, 1985

INVENTOR(S) : Kurt C. Melancon

It is certified that error appears in the above-identified patent and that said Letters Patent is hereby corrected as shown below:

Col. 13, line 45, kindly delete "adhesive".

Col. 14, line 34, kindly delete "adhesive".

Col. 14, lines 36-37, kindly delete "adhe-sive".

Signed and Sealed this

Sixth Day of November, 1990

Attest:

HARRY F. MANBECK, JR.

*Attesting Officer*     *Commissioner of Patents and Trademarks*